United States Patent
Kim et al.

(10) Patent No.: US 12,078,777 B2
(45) Date of Patent: Sep. 3, 2024

(54) OPTICAL LAMINATE, POLARIZING PLATE, AND DISPLAY DEVICE

(71) Applicant: LG CHEM, LTD., Seoul (KR)

(72) Inventors: Jaeyoung Kim, Daejeon (KR); Yeongrae Chang, Daejeon (KR); Jung Hyun Seo, Daejeon (KR); Min Soo Kim, Daejeon (KR); Intaek Song, Daejeon (KR)

(73) Assignee: LG CHEM, LTD., Seoul (KR)

(*) Notice: Subject to any disclaimer, the term of this patent is extended or adjusted under 35 U.S.C. 154(b) by 819 days.

(21) Appl. No.: 17/047,489

(22) PCT Filed: Nov. 14, 2019

(86) PCT No.: PCT/KR2019/015559
§ 371 (c)(1),
(2) Date: Oct. 14, 2020

(87) PCT Pub. No.: WO2020/101396
PCT Pub. Date: May 22, 2020

(65) Prior Publication Data
US 2021/0116605 A1 Apr. 22, 2021

(30) Foreign Application Priority Data

Nov. 15, 2018 (KR) .................. 10-2018-0140845
Nov. 15, 2018 (KR) .................. 10-2018-0140846

(51) Int. Cl.
*G02B 1/111* (2015.01)
*G02B 1/11* (2015.01)
(Continued)

(52) U.S. Cl.
CPC ............... *G02B 1/111* (2013.01); *G02B 1/11* (2013.01); *G02B 1/14* (2015.01); *G02B 5/3025* (2013.01);
(Continued)

(58) Field of Classification Search
CPC .. G02B 1/11; G02B 1/14; G02B 1/111; C09K 2323/03; G02F 1/133502;
(Continued)

(56) References Cited

U.S. PATENT DOCUMENTS

2007/0248828 A1 10/2007 Yoneyama et al.
2013/0250414 A1 9/2013 Eguchi et al.
(Continued)

FOREIGN PATENT DOCUMENTS

CN 102933993 A 2/2013
CN 104903763 A 9/2015
(Continued)

OTHER PUBLICATIONS

Extended European Search Report dated Oct. 15, 2021, of the corresponding European Patent Application No. 19885681.7, 17 pages.
(Continued)

*Primary Examiner* — Sophie Hon
(74) *Attorney, Agent, or Firm* — ROTHWELL, FIGG, ERNST & MANBECK, P.C.

(57) ABSTRACT

The present disclosure provides an optical laminate including a polymer substrate and an antiglare layer, wherein rubber particles having a cross-sectional diameter of 10 to 500 nm exist within 50% of the thickness of the antiglare layer from the interface between the polymer substrate and the antiglare layer, a polarizing plate including the optical laminate, and a liquid crystal display and a display device including the polarizing plate.

16 Claims, 7 Drawing Sheets

(51) Int. Cl.
    *G02B 1/14* (2015.01)
    *G02B 5/30* (2006.01)
    *G02F 1/1335* (2006.01)

(52) U.S. Cl.
    CPC .... *G02F 1/133528* (2013.01); *C09K 2323/03* (2020.08); *G02F 1/133502* (2013.01)

(58) Field of Classification Search
    CPC ..... C09J 133/04; C08F 222/103; C08L 33/12; C08L 220/20
    See application file for complete search history.

(56) References Cited

U.S. PATENT DOCUMENTS

| | | |
|---|---|---|
| 2013/0279155 A1 | 10/2013 | Kuroda et al. |
| 2014/0126064 A1 | 5/2014 | Kishi et al. |
| 2015/0183945 A1 | 7/2015 | Shiraishi et al. |
| 2015/0355386 A1 | 12/2015 | Horii et al. |
| 2016/0146978 A1 | 5/2016 | Lee et al. |
| 2016/0297938 A1 | 10/2016 | Shiraishi et al. |
| 2017/0343704 A1 | 11/2017 | Kim et al. |
| 2018/0348408 A1 | 12/2018 | Serizawa et al. |
| 2019/0225831 A1 | 7/2019 | Seo et al. |
| 2019/0235134 A1 | 8/2019 | Ibuki et al. |
| 2020/0041696 A1 | 2/2020 | Seo et al. |

FOREIGN PATENT DOCUMENTS

| | | | | |
|---|---|---|---|---|
| CN | 105005104 A | | 10/2015 | |
| CN | 111971593 B | * | 11/2022 | .......... C08F 222/103 |
| EP | 2725393 A1 | | 4/2014 | |
| EP | 3754387 B1 | * | 4/2024 | .......... C08F 222/103 |
| JP | 2003-156606 A | | 5/2003 | |
| JP | 2008-040275 A | | 2/2008 | |
| JP | 2008-132746 A | | 6/2008 | |
| JP | 2009-162821 A | | 7/2009 | |
| JP | 2010-217394 A | | 9/2010 | |
| JP | 2012-018383 A | | 1/2012 | |
| JP | 2012-180422 A | | 9/2012 | |
| JP | 2012180422 A | * | 9/2012 | .......... B29C 47/0021 |
| JP | 2013-254207 A | | 12/2013 | |
| JP | 2015-004674 A | | 1/2015 | |
| JP | 2015-206837 A | | 11/2015 | |
| JP | 2016-045194 A | | 4/2016 | |
| JP | 7378871 B2 | * | 11/2023 | .......... C08F 222/103 |
| KR | 10-2007-0022059 A | | 2/2007 | |
| KR | 10-2013-0034629 A | | 4/2013 | |
| KR | 10-2013-0108082 A | | 10/2013 | |
| KR | 10-2013-0127984 A | | 11/2013 | |
| KR | 10-2014-0036771 A | | 3/2014 | |
| KR | 10-2015-0120264 A | | 10/2015 | |
| KR | 10-2016-0100284 A | | 8/2016 | |
| KR | 10-1656454 B1 | | 9/2016 | |
| KR | 10-1735690 B1 | | 5/2017 | |
| KR | 10-2017-0137016 A | | 12/2017 | |
| KR | 10-2017-0137686 A | | 12/2017 | |
| KR | 10-2018-0023016 A | | 3/2018 | |
| KR | 10-2018-0067443 A | | 6/2018 | |
| KR | 10-2018-0070494 A | | 6/2018 | |
| KR | 102428883 B1 | * | 8/2022 | .......... C08F 222/103 |
| KR | 102440277 B1 | * | 9/2022 | .......... C08F 222/103 |
| TW | 200935103 A | | 8/2009 | |
| TW | 201137409 A | | 11/2011 | |
| TW | 201213429 A | | 4/2012 | |
| TW | 201541113 A | | 11/2015 | |
| TW | 1712826 B | * | 11/2020 | .......... C08F 222/103 |
| WO | 2013-002353 A1 | | 1/2013 | |
| WO | 2014-109370 A1 | | 7/2014 | |
| WO | 2017-141903 A1 | | 8/2017 | |
| WO | 2018-074137 A1 | | 4/2018 | |

OTHER PUBLICATIONS

Extended European Search Report dated Jul. 27, 2021, of the corresponding European Patent Application No. 19885681.7, 14 pages.
International Search Report issued for International Application No. PCT/KR2019/015559 on Mar. 6, 2020, 4 pages.
"ethanol," Wikipedia [online], retrieved from the internet: < https://ja.wikipedia.org/wiki/%E3%82%A8%E3%82%BF%E3%83%8E%E3%83%BC%E3%83%AB> on Jun. 14, 2024, 14 pages.
"2-butanol," Wikipedia [online], retrieved from the internet: < https://ja.wikipedia.org/wiki/2%E3%83%96%E3%82%BF%E3%83%8E%E3%83%BC%E3%83%AB> on Jun. 14, 2024, 2 pages.
"Butyl Acetate," Wikipedia [online], retrieved from the internet: < https://ja.wikipedia.org/wiki/%E9%85%A2%E9%85%B8%E3%83%96%E3%83%81%E3%83%AB> on Jun. 14, 2024, 2 pages.
"Methyl isobutyl ketone," Wikipedia [online], retrieved from the internet: < https://ja.wikipedia.org/wiki/%E3%83%A1%E3%83%81%E3%83%AB%E3%82%A4%E3%82%BD%E3%83%96%E3%83%81%E3%83%AB%E3%82%B1%E3%83%88%E3%83%B3> on Jun. 14, 2024, 3 pages.
"n-butanol," Mitsubishi Chemical Group [online], retrieved from the internet: < https://www.mchemical.co.jp/products/departments/mcc/oxo/product/1200276_88684.html> on Jun. 14, 2024, 4 pages.

* cited by examiner

OPTICAL LAMINATE, POLARIZING PLATE, AND DISPLAY DEVICE

CROSS-REFERENCE TO RELATED APPLICATION(S)

This application is a 35 U.S.C. 371 National Phase Entry Application from PCT/KR2019/015559 filed on Nov. 14, 2019, designating the United States, which claims priority to or the benefit of Korean Patent Application No. 10-2018-0140845 filed with the Korean Intellectual Property Office on Nov. 15, 2018, and Korean Patent Application No. 10-2018-0140846 filed with the Korean Intellectual Property Office on Nov. 15, 2018, the disclosures of which are incorporated herein by reference in their entirety.

TECHNICAL FIELD

The present disclosure relates to an optical laminate, a polarizing plate, and a display device.

BACKGROUND OF THE INVENTION

Liquid crystal display device has various advantages such as electric power saving, light weight, and thinness, and thus is used at the highest ratio among various display devices.

In such a liquid crystal display device, a polarizer is arranged on the image display surface side of a liquid crystal cell.

Therefore, in order to prevent the polarizer from being damaged when handling/using the liquid crystal display device, it is generally known that a polarizer protective film including a hard coating layer or the like having a hardness of a predetermined level or higher is applied on the polarizer.

Such a polarizer protective optical film generally has a shape in which a hard coating layer is formed on a light-transmissive substrate film. As such a light-transmissive substrate film, the cellulose ester-based film represented by triacetyl cellulose (TAC) is most widely used.

The cellulose ester-based film has advantages that it is excellent in transparency and optical isotropy, hardly exhibits in-plane retardation, does not generate interference fringes, and has little adverse effect on the display quality of display device.

However, the cellulose ester-based film is not only a material having disadvantages in terms of cost, but also has disadvantages of high water permeability and poor water resistance.

Due to such high water vapor permeability/poor water resistance, during use a considerable amount of water vapor permeation can occur continuously and a phenomenon of lifting from the polarizer may occur, which can cause light leakage.

Accordingly, a substrate film of a polarizer protective optical film capable of securing higher water resistance and preventing the light leakage phenomenon and having more excellent mechanical properties has been developed.

BRIEF SUMMARY OF THE INVENTION

The present disclosure provides an optical laminate realizing high contrast ratio and excellent image sharpness, and having mechanical properties such as high wear resistance and scratch resistance.

The present disclosure also provides a polarizing plate realizing high contrast ratio and excellent image sharpness, and having mechanical properties such as high wear resistance and scratch resistance.

The present disclosure further provides a liquid crystal panel and a display device including the above-mentioned optical laminate, respectively.

In one aspect, there is provided an optical laminate including: a polymer substrate containing a polymer resin and rubber particles having a cross-sectional diameter of 10 to 500 nm dispersed in the polymer resin; and an antiglare layer containing a binder resin and organic fine particles or inorganic fine particles dispersed in the binder resin, wherein rubber particles having a cross-sectional diameter of 10 to 500 nm exist within 50% of the thickness of the antiglare layer from the interface between the polymer substrate and the antiglare layer.

In another aspect, there is provided a polarizing plate including the above-mentioned optical laminate.

In yet another aspect, there is provided a display device including the above-mentioned polarizing plate.

BRIEF DETAILED DESCRIPTION OF THE INVENTION

Hereinafter, the optical laminate, the polarizing plate, and the display device according to specific embodiments of the present disclosure will be described in more detail.

Terms such as first, second, and the like may be used to describe various components, and the terms are used only to discriminate one constituent element from another component.

Further, a (meth)acryl is meant to include both acryl and methacryl.

Further, the inorganic nanoparticles having a hollow structure refer to particles in a form in which an empty space exists on the surface of and/or inside the inorganic nanoparticles.

In addition, a (co)polymer is meant to include both a co-polymer and a homo-polymer.

According to one embodiment of the present disclosure, there can be provided an optical laminate including: a polymer substrate containing a polymer resin and rubber particles having a cross-sectional diameter of 10 to 500 nm dispersed in the polymer resin; and an antiglare layer containing a binder resin and organic fine particles or inorganic fine particles dispersed in the binder resin, wherein rubber particles having a cross-sectional diameter of 10 to 500 nm exist within 50% of the thickness of the antiglare layer from the interface between the polymer substrate and the antiglare layer.

In the optical laminate, rubber particles having a cross-sectional diameter of 10 to 500 nm exist within 50% of the thickness of the antiglare layer, within 30% of the thickness, or within 10% of the thickness of the anti-glare layer from the interface between the polymer substrate and the antiglare layer, whereby the optical laminate can have relatively high scratch resistance and durability, while exhibiting excellent optical properties and anti-glare properties such as low glossiness and reflectance, and an appropriate level of haze properties.

Rubber particles having a cross-sectional diameter of 10 to 500 nm contained in the polymer substrate may migrate into the antiglare layer and expose to the outer surface of the antiglare layer during the manufacturing process of the optical laminate. The present inventors have adjusted so that the rubber particles are located within 50% of the thickness of the antiglare layer, or within 30% of the thickness, or within 10% of the thickness from the interface between the polymer substrate and the antiglare layer.

As such, the rubber particles are located from the interface between the polymer substrate and the antiglare layer only to a range within 50% of the thickness of the antiglare layer, or within 30% of the thickness, or within 10% of the thickness. And thus, lowering scratch resistance of the optical laminate, increasing reflectance of the optical laminate, or inducing a stain on the appearance of the optical laminate, caused by phenomena that the rubber particles are exposed to the outer surface of the antiglare layer or are located on the upper surface of the antiglare layer, are prevented.

More specifically, when applying a temperature exceeding 60° C. during heat treatment or drying a coating composition for forming the anti-glare layer, the rubber particles are raised to the anti-glare layer formed in the polymer substrate, and the rubber particles may be positioned from an interface between the polymer substrate and the antiglare layer to a range exceeding 50% of the thickness of the antiglare layer.

Thus, the coating composition for forming the antiglare layer may be coated and a temperature of 70° C. or less may be applied during heat treatment or drying.

Meanwhile, the characteristics of the antiglare layer described above may be due to specifying the content of solids excluding the solvent in the coating composition for forming the anti-glare layer, or the type of organic solvent used when forming the antiglare layer, or the like.

More specifically, the content of solids excluding the solvent in the coating composition for forming the antiglare layer may be 25 to 40% by weight or 30 to 35% by weight.

Further, the coating composition for forming the antiglare layer may include a specific organic solvent.

The organic solvent may be one kind or two or more kinds of alcohols, or a mixed solvent including an organic solvent of alcohols and non-alcohols.

More specifically, the organic solvent may be an organic solvent containing ethanol and 2-butanol in a weight ratio of 0.5:1 to 2:1, or an organic solvent including n-butyl acetate and 2-butanol in a weight ratio of 1:2 to 1:5.

In general, while the higher the haze value, the greater the degree of diffusion of external light, thereby providing an excellent antiglare effect, there is a problem that the contrast ratio is decreased due to an image distortion phenomenon caused by surface scattering and a whitening phenomenon caused by internal scattering.

On the contrary, the optical laminate of the embodiment includes the above-mentioned antiglare layer and thus can exhibit a high contrast ratio and excellent image sharpness while having a haze value that is not so high.

The antiglare layer or the optical laminate may have a total haze of 0.1% or more and 10% or less, as measured according to JIS K7105 standard using a haze meter (HM-150, A light source, manufactured by Murakami Color Research Laboratory).

The total haze is the sum of the external haze and the internal haze.

The total haze can be obtained by measuring the haze with respect to the optical laminate itself, and the internal haze may be measured by attaching an adhesive having a haze of 0 to the surface to form a flattening layer, or coating the flattening layer onto an alkali treated surface. As the total haze and internal haze values are defined, the external haze value may be defined.

The external haze of the antiglare layer or the optical laminate may be 0.2% or more and 9% or less.

If the external haze of the antiglare layer or the optical laminate is too low, it may not exhibit sufficient antiglare functions.

Further, when the external haze of the antiglare layer or the optical laminate is too high, the transmitted image is not clear and the light transmittance is lowered, which is not suitable for a protection film provided for the display.

Further, the antiglare layer or the polarizing plate may have an image sharpness of 200 or more and 450 or less as measured using an ICM-1T manufactured by Suga Test Instrument Co., Ltd.

The image sharpness is measured with a slit width of 0.125 mm, 0.5 mm, 1 mm, or 2 mm and displayed as a total.

Such an antiglare layer and/or a polarizing plate may simultaneously exhibit excellent anti-glare function and image sharpness.

On the other hand, as described above, in the manufacturing process of the optical laminate, a part of the rubber particles contained in the polymer substrate may move to the antiglare layer, whereby the rubber particles having a cross-sectional diameter of 10 to 500 nm existing within 50% of the thickness of the antiglare layer from the interface between the polymer substrate and the antiglare layer and the rubber particles having a cross-sectional diameter of 10 to 500 nm contained in the polymer substrate may be rubber particles of the same components.

The rubber particles can be natural rubber or synthetic rubber which is commonly known in the art.

For example, a specific type of the rubber particles is not particularly limited, but it may include one or more rubbers selected from the group consisting of styrene-butadiene-based rubber and acrylic-based rubber.

The styrene-based monomer used in the production of the styrene-butadiene-based rubber may be an unsubstituted styrene monomer or a substituted styrene monomer.

The substituted styrene monomer may be styrene in which a benzene ring or vinyl group is substituted with a substituent containing an aliphatic hydrocarbon or a hetero atom.

Examples thereof may be one or more selected from the group consisting of styrene, α-methylstyrene, 3-methylstyrene, 4-methylstyrene, 2,4-dimethylstyrene, 2,5-dimethylstyrene, 2-methyl-4-chlorosytrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene and β-bromostyrene, but are not limited thereto.

More preferably, styrene substituted with $C_{1-4}$ alkyl or halogen can be used.

The butadiene-based monomer may be one or more selected from the group consisting of 1,3-butadiene, isoprene, 2,3-dimethyl-1,3-butadiene, 2-ethyl-1,3-butadiene, 1,3-pentadiene and chloroprene. Most preferably, 1,3-butadiene can be used in terms of good copolymerizability.

Specific examples of the acrylate-based monomers include methacrylic acid esters including methyl methacrylate, ethyl methacrylate, propyl methacrylate, butyl methacrylate, hexyl methacrylate, 2-ethylhexyl methacrylate, and benzyl methacrylate; acrylic acid esters including methyl acrylate, ethyl acrylate, propyl acrylate, butyl acrylate, hexyl acrylate, 2-ethylhexyl acrylate, cyclohexyl methacrylate, phenyl methacrylate, and benzyl methacrylate; unsaturated carboxylic acids including acrylic acid and methacrylic acid;

acid anhydrides including maleic anhydride; esters containing hydroxy group including 2-hydroxyethyl acrylate, 2-hydroxypropyl acrylate and monoglycerol acrylate; or mixtures thereof.

The acrylonitrile-based monomer may be one or more selected from the group consisting of acrylonitrile, methacrylonitrile, ethacrylonitrile, phenyl acrylonitrile and α-chloroacrylonitrile.

Among them, acrylonitrile and methacrylonitrile are preferred in terms of good polymerizability and easy availability of raw-materials. In particular, acrylonitrile is most preferred.

The rubber particles may be formed of a single layer of such particles having rubber elasticity, or may be a multilayer structure having at least one rubber elastic layer.

Acrylic rubber particles with a multilayer structure include those whose core is particles having rubber elasticity as described above and whose periphery is covered with a hard alkyl methacrylate polymer, those whose core is a hard methacrylic acid alkyl ester polymer and whose periphery is covered with an acrylic polymer having rubber elasticity as described above, those in which the periphery of the hard core is covered with an acrylic polymer having rubber elasticity and the periphery thereof is covered with a hard alkyl methacrylate polymer, and the like.

The average diameter of the rubber particles formed in an elastic layer is usually in the range of about 10 to 500 nm.

Meanwhile, the polymer substrate may have a thickness of 10 to 150 μm, 20 to 120 μm, or 30 to 100 μm.

If the thickness of the polymer substrate is less than 10 μm, the flexibility is reduced and it may be difficult to control the process.

In addition, when the polymer substrate is too thick, the transmittance of the polymer substrate is reduced, the optical characteristics can be reduced, and it is difficult to thin an image display device including the same.

The antiglare layer may have a thickness of 1 to 10 μm.

If the thickness of the antiglare layer is too thin, organic particles or inorganic particles are aggregated and thus irregularly distributed peaks can exist while having a high height on the antiglare layer surface. If the thickness of the antiglare layer is 10 μm or more, there is a drawback that the coating layer is thick and thus cracks are easy to occur when handling the coating film.

By adjusting the thickness of the antiglare layer in the above-described range, it is possible to realize a specific range of haze and image sharpness, thereby increasing the sharpness of the image while maintaining antiglare functions.

Meanwhile, the ratio of the thickness of the antiglare layer to the thickness of the polymer substrate may be 0.008 to 0.8, or 0.01 to 0.5.

If the ratio of the thickness of the antiglare layer to the thickness of the polymer substrate is too small, the antiglare layer does not sufficiently protect the surface of the substrate and thus it may be difficult to secure mechanical properties such as pencil hardness.

Further, when the ratio of the thickness of the antiglare layer to the thickness of the polymer substrate is too large, the flexibility of the laminate is reduced and the crack resistance may be insufficient.

The polymer substrate may include 5 to 50 parts by weight of rubber particles having a cross-sectional diameter of 10 to 500 nm relative to 100 parts by weight of the binder resin.

If the content of the rubber particles in the polymer substrate is too small compared to the binder resin, there is a disadvantage that the mechanical strength of the film is insufficient and thus cracks are easy to occur when handling the film.

If the content of the rubber particles in the polymer substrate is too high compared to the binder resin, there is a problem that aggregation between the particles occurs and the transmittance is reduced.

Specific components of the polymer substrate are not particularly limited, but in order to secure moisture resistance together with a predetermined light transmittance, the polymer resin may include one or more selected from the group consisting of a (meth)acrylate resin, a cellulose resin, a polyolefin resin, and a polyester resin.

In the optical laminate, the moisture permeation amount of the polymer substrate measured for 24 hours at 40° C. and 100% humidity may be 150 $g/m^2$ or less, or 75 $g/m^2$ or less, or 5 to 75 $g/m^2$.

More specifically, the polymer substrate may have an amount of water vapor permeation of 150 $g/m^2$ or less, 100 $g/m^2$ or less, or 75 $g/m^2$ or less, or 5 to 75 $g/m^2$, as measured for 24 hours at 40° C. and 100% humidity (measurement equipment: Labthink Instruments Co., Ltd.'s Water Vapor Permeability Tester), Meanwhile, the antiglare layer may include 2 to 10 parts by weight of the organic fine particles relative to 100 parts by weight of the binder resin, and it may include 0 to 20 parts by weight of the inorganic fine particles relative to 100 parts by weight of the organic fine particles.

Further, the antiglare layer may include 1 to 10 parts by weight of the organic fine particles or the inorganic fine particles, respectively, relative to 100 parts by weight of the binder resin.

If the content of the organic fine particles in the antiglare layer is too small compared to the binder, the scattering/reflection of external light is not properly controlled, and thus the anti-glare property may be greatly reduced. If the thickness of the antiglare layer is adjusted to 1 μm or less in order to obtain an appropriate haze, the mechanical properties of the film may be reduced, which is technically disadvantageous.

If the content of the organic fine particles in the antiglare layer is too high compared to the binder, it may be disadvantageous because stains due to partial aggregation of organic fine particles may occur.

If the content of the inorganic fine particles is too high compared to the organic fine particles, excessive aggregation of the organic fine particles is induced and thus, the image sharpness may be excessively lowered and the sharpness of the transmitted image is reduced.

The binder resin contained in the antiglare layer may include a photocurable resin.

The photocurable resin means a (co)polymer of a photopolymerizable compound that can cause a polymerization reaction when irradiated with light such as ultraviolet rays.

Specific examples of the photopolymerizable compound include a (co)polymer formed from a vinyl-based monomer or oligomer or a (meth)acrylate monomer or oligomer.

Examples of the photocurable resin include: a polymer or copolymer formed from i) a reactive acrylate oligomer group consisting of urethane acrylate oligomer, epoxide acrylate oligomer, polyester acrylate, and polyether acrylate; ii) a group consisting of a polyfunctional acrylate monomer including dipentaerythritol hexaacrylate, dipentaerythritol pentaacrylate, pentaerythritol tetraacrylate, pentaerythritol triacrylate, trimethylolpropane triacrylate, glycerin propoxylate triacrylate, trimethylpropane ethoxylate triacrylate, trimethylpropyl triacrylate, 1,6-hexanediol diacrylate, tripropylene glycol diacrylate, and ethylene glycol diacrylate; iii) an epoxy resin including epoxy group, alicyclic epoxy group, glycidyl group epoxy group, or epoxy group containing oxetane group; or iv) the like.

The binder resin may further include a (co)polymer (hereinafter referred to as high molecular weight (co)polymer) having a weight average molecular weight of 10,000 g/mol or more together with the above-mentioned photocurable resin.

The high molecular weight (co)polymer may include, for example, one or more polymers selected from the group consisting of a cellulose-based polymer, an acrylic-based polymer, a styrene-based polymer, an epoxide-based polymer, a nylon-based polymer, an urethane-based polymer and a polyolefin-based polymer.

The particle diameter of the organic or inorganic fine particles is not particularly limited.

The organic fine particles contained in the antiglare layer may be a micron (μm) scale, and the inorganic fine particles contained in the antiglare layer may be a nano (nm) scale.

In the present disclosure, a micron (μm) scale refers to having a particle size or a particle diameter of less than 1 mm, that is, less than 1000 μm, a nano (nm) scale refers to having a particle size or a particle diameter of less than 1 μm, that is, less than 1000 nm, and a sub-micron (sub-μm) scale refers to having a particle size or a particle diameter of a micron scale or nano scale.

More specifically, the organic fine particles may have a cross-sectional diameter of 1 to 50 μm, or 1 to 10 μm.

Further, the inorganic fine particles may have a cross-sectional diameter of 1 nm to 500 nm, or 1 nm to 300 nm.

Specific examples of the organic or inorganic fine particles contained in the antiglare layer are not limited, but for example, the organic or inorganic fine particles may be organic fine particles composed of acrylic-based resin, styrene-based resin, epoxide resin and nylon resin, or inorganic fine particles composed of silicon oxide, titanium dioxide, indium oxide, tin oxide, zirconium oxide, and zinc oxide.

Meanwhile, in the antiglare layer, the ratio of the fine protrusions having a diameter of 100 μm or more formed by aggregating the organic fine particles or the inorganic fine particles existing on the outer surface of the antiglare layer may be $50/m^2$ or less.

As the ratio of the fine protrusions having a diameter of 100 μm or more formed by aggregating the organic fine particles or the inorganic fine particles existing on the outer surface of the antiglare layer is $50/m^2$ or less, or 1 to $30/m^2$, or substantially absent, the optical laminate of the above-mentioned embodiment can realize high contrast ratio and uniform and good image sharpness while having a relatively low haze value.

The antiglare layer and/or the polarizing plate may have a transmittance of 90% or more, a haze of 10% or less, or 8% or less under an A light source.
(Measuring Instrument: HM-150, Measurement Standard: JIS K 7105)

More specifically, when the fine protrusions formed by aggregating the organic fine particles or the inorganic fine particles reach a size having a diameter of 100 μm or more, a sparkling (glittering) phenomenon that is visible to the naked eye may occur. As the ratio of the fine protrusions formed on the outer surface of the antiglare layer is relatively low, a sparkling (glittering) phenomenon due to amplification of the reflected light can be prevented, and the sharpness of the image is uniform, thereby clearly realizing a high-resolution image.

In general, while the higher the haze value, the greater the degree of diffusion of external light, thereby providing an excellent antiglare effect, there is a problem that the contrast ratio is decreased due to an image distortion phenomenon caused by surface scattering and a whitening phenomenon caused by internal scattering.

On the contrary, the optical laminate of the embodiment includes the above-mentioned antiglare layer and thus can realize high contrast ratio and excellent image sharpness while having a haze value that is not so high.

The diameter of the fine protrusions formed by aggregating the organic fine particles or the inorganic fine particles may be determined by the cross-sectional width in a direction parallel to the surface of the antiglare layer, and may be 100 μm or more, or 100 μm to 300 μm, or 110 μm to 250 μm, or 120 μm to 200 μm.

As described above, the ratio of the fine protrusions having a diameter of 100 μm or more formed by aggregating the organic fine particles or the inorganic fine particles existing on the outer surface of the antiglare layer may be $50/m^2$ or less, or 1 to $30/m^2$. In addition, the ratio of the area where the fine protrusions are located on one surface of the antiglare layer defined by the following general formula 1 is 0.5 area % or less, 0.3 area % or less, or 0.01 to 0.5 area %, or 0.02 to 0.2 area %, or 0.05 to 1 area %.

The ratio of the area where the fine protrusions are located on one surface of the antiglare layer= (the number of fine protrusions*the area of a circle having a diameter of 5 mm)/the area of one side of the antiglare layer (mm$^2$) [General Formula 1]

The "circle having a diameter of 5 mm" in the general formula 1 is defined as an area where the fine protrusions are located.

The characteristics of the antiglare layer described above may be due to specifying the content of solids excluding the solvent in the coating composition for forming the anti-glare layer, or the type of organic solvent used when forming the antiglare layer, or the like.

More specifically, the content of solids excluding the solvent in the coating composition for forming the antiglare layer may be 25 to 40% by weight or 30 to 35% by weight.

As the content of solids of the coating composition for forming the anti-glare layer is adjusted in the above-described range, the flow of organic fine particles or inorganic fine particles may be smoothly conducted during the formation of the antiglare layer, and thereby, the fine protrusions, which are aggregates thereof, may not be substantially generated.

Further, the coating composition for forming the antiglare layer may include a specific mixed solvent.

The organic solvent may include an organic solvent of alcohols and non-alcohols, and more specifically, the organic solvent may be a mixed solvent including n-butyl acetate and 2-butanol.

Further, the organic solvent may include n-butyl acetate and 2-butanol in a weight ratio of 1:2 to 1:5.

By using the above-mentioned organic solvent, the flow of organic fine particles or inorganic fine particles may be smoothly conducted during the formation of the antiglare layer, and thereby, the fine protrusions, which are excessive aggregates thereof, may not be substantially generated.

Meanwhile, the optical laminate of the embodiment is formed on one surface of the antiglare layer, and it may further include a low refractive index layer having a refractive index of 1.20 to 1.60 in the wavelength region of 380 nm to 780 nm.

The low refractive index layer having a refractive index of 1.20 to 1.60 in the wavelength region of 380 nm to 780 nm may include a binder resin and organic particles or inorganic particles dispersed in the binder resin. Optionally, it may further include a fluorine-containing compound having a photoreactive functional group and/or a silicon-based compound having a photoreactive functional group.

The binder resin contains a (co)polymer containing a polyfunctional (meth)acrylate repeating unit, and such repeating unit may be, for example, from a polyfunctional (meth)acrylate compound such as trimethylolpropane triacrylate (TMPTA), trimethylolpropaneethoxy triacrylate (TMPEOTA), glycerin propoxylated triacrylate (GPTA), pentaerythritol tetraacrylate (PETA), or dipentaerythritol hexaacrylate (DPHA).

The photoreactive functional group contained in the fluorine-containing compound or silicon-based compound may include one or more functional groups selected from the group consisting of (meth)acrylate group, epoxide group, vinyl group, and thiol group.

The fluorine-containing compound containing the photoreactive functional group may be one or more compounds selected from the group consisting of i) an aliphatic compound or an aliphatic cyclic compound in which at least one photoreactive functional group is substituted and at least one fluorine is substituted for at least one carbon; ii) a heteroaliphatic compound or heteroaliphatic cyclic compound in which at least one photoreactive functional group is substituted, at least one hydrogen is substituted with fluorine and at least one carbon is substituted with silicon; iii) a polydialkylsiloxane-based polymer in which at least one photoreactive functional group is substituted and at least one fluorine is substituted for at least one silicon; and iv) a polyether compound in which at least one photoreactive functional group is substituted and at least one hydrogen is substituted with fluorine.

The low refractive index layer may include hollow inorganic nanoparticles, solid inorganic nanoparticles, and/or porous inorganic nanoparticles.

The hollow inorganic nanoparticles refer to particles having a maximum diameter of less than 200 nm and having a void space on the surface and/or inside thereof.

The hollow inorganic nanoparticles may include one or more selected from the group consisting of inorganic fine particles having a number average particle diameter of 1 to 200 nm, or 10 to 100 nm.

Further, the hollow inorganic nanoparticles may have a density of 1.50 g/cm$^3$ to 3.50 g/cm$^3$.

The hollow inorganic nanoparticles may contain one or more reactive functional groups selected from the group consisting of a (meth)acrylate group, an epoxide group, a vinyl group, and a thiol group on the surface.

By containing the above-mentioned reactive functional group on the surface of the hollow inorganic nanoparticles, it may have a higher degree of crosslinking.

The solid inorganic nanoparticles may include one or more selected from the group consisting of solid inorganic fine particles having a number average particle diameter of 0.5 to 100 nm.

The porous inorganic nanoparticles may include one or more selected from the group consisting of inorganic fine particles having a number average particle diameter of 0.5 to 100 nm.

The low reflection layer may include 10 to 400 parts by weight of the inorganic nanoparticles; and 20 to 300 parts by weight of a fluorine-containing compound and/or a silicon-based compound including the photoreactive functional group relative to 100 parts by weight of the (co)polymer.

Meanwhile, according to another embodiment of the present disclosure, there can be provided a polarizing plate including the optical laminate.

The polarizing plate may include the optical laminate as a polarizer protective film.

Accordingly, the polarizing plate may include a polarizer and an optical laminate formed on one surface of the polarizer, and a second polarizer protective film formed on the other surface of the polarizer so as to face the optical laminate.

The second polarizer protective film may be a polymer substrate contained in the optical laminate, an ester resin film such as PET, a cellulose film such as TAC, or the like.

The polarizing plate of this embodiment includes a polarizer.

As the polarizer, a polarizer well known in the art, for example, a film composed of polyvinyl alcohol (PVA) containing iodine or dichroic dyes may be used.

In this case, the polarizer may be manufactured by dying iodine or dichromatic dyes on the polyvinyl alcohol film and stretching the film, but the manufacturing method is not particularly limited.

Meanwhile, when the polarizer is a polyvinyl alcohol film, the polyvinyl alcohol film may be used without particular limitation as long as it contains a polyvinyl alcohol resin or a derivative thereof.

At this time, examples of the derivative of the polyvinyl alcohol resin include, but are not limited to, polyvinyl formal resin, polyvinyl acetal resin, and the like.

Alternatively, the polyvinyl alcohol film may be a commercially available polyvinyl alcohol film generally used for the production of polarizers in the art, for example, P30, PE30 or PE60 manufactured by Kuraray, M3000, or M6000 manufactured by Nippon Synthetic Chemical Industry Co., Ltd., or the like.

The degree of polymerization of the polyvinyl alcohol film is not limited, but may be 1,000 to 10,000, preferably, 1,500 to 5,000.

When the degree of polymerization satisfies this range, molecules may move freely and may be smoothly combined with iodine, a dichroic dye, or the like.

Further, the polarizer may have a thickness of 40 µm or less, 30 µm or less, 20 µm or less, 1 to 20 µm, or 1 µm to 10 µm.

In this case, devices, such as a polarizing plate and an image display device containing the polarizer can be made thinner and lighter.

The polarizing plate may further include an adhesive layer which is located between the polarizer and the polymer substrate of the optical laminate and which has a thickness of 0.1 µm to 5 µm In the adhesive layer, various polarizing plate adhesives used in the art, for example, polyvinyl alcohol-based adhesives, polyurethane-based adhesives, acrylic-based adhesives, cationic-based or radical-based adhesives and the like can be used as the adhesive without limitation.

According to another embodiment of the present disclosure, there can be provided a display device including the above-described optical laminate or polarizing plate.

Specific examples of the display device are not limited, and may be, for example, a device such as a liquid crystal display, a plasma display device, or an organic light emitting diode device.

As one example, the display device may be a liquid crystal display device including a pair of polarizing plates facing each other; a thin film transistor, a color filter, and a liquid crystal cell sequentially stacked between the pair of polarizing plates; and a backlight unit.

In the display device, the optical laminate or the polarizing plate may be provided on the outermost surface of a display panel facing an observer or on the outermost surface thereof facing a backlight.

In another example, the display device may include a display panel; and a polarizing plate disposed on at least one surface of the display panel.

The display device may be a liquid crystal display device including a liquid crystal panel and an optical laminate provided on both surfaces of the liquid crystal panel, wherein at least one of the polarizing plates may be a polarizing plate including a polarizer according to one embodiment of the present disclosure.

At this time, the type of liquid crystal panel included in the liquid crystal display device is not particularly limited, but for example, a known panel such as a passive matrix-type panel such as a twisted nematic (TN), super twisted nematic (STN), ferroelectric (F) or polymer dispersed (PD) panel, an active matrix-type panel such as a two or three terminal panel, an in-plane switching (IPS) panel or a vertical alignment (VA) panel may be used.

Advantageous Effects

According to the present disclosure, an optical laminate realizing high contrast ratio and excellent image sharpness, and having mechanical properties such as high wear resistance and scratch resistance, a polarizing plate including the optical laminate, and a liquid crystal panel and a display device including the polarizing plate can be provided.

DETAILED DESCRIPTION OF THE EMBODIMENTS

Hereinafter, embodiments of the present disclosure will be described in more detail by way of examples. However, these examples are provided for illustrative purposes only and are not intended to limit the scope of the present disclosure.

Preparation Example 1 and 2: Preparation of Coating Composition for Forming Antiglare Layer Preparation Example 1

25 wt % of pentaerythritol tri(tetra)acrylate, 22.4 wt % of UA-306T (reaction product of toluene diisocyanate and pentaerythritol triacrylate as urethane acrylate, manufactured by Kyoeisha Chemical), 2.5 wt % of Irgacure 184 as a photopolymerization initiator, 24.5 wt % of ethanol, 24.5 wt % of 2-butanol, 1 wt % of XX-113BQ (average diameter: 2.0 μm, refractive index: 1.555, copolymerized particles of polystyrene and polymethyl methacrylate, manufactured by Sekisui Plastic), 0.1 wt % of MA-ST (silica particles having a diameter of 15 nm, manufactured by Nissan Chemical) were mixed to prepare a coating composition for forming an antiglare layer.

Preparation Example 2

25 wt % of pentaerythritol tri(tetra)acrylate, 22.4 wt % of 2-hydroxy ethyl acrylate, 2.5 wt % of Irgacure 184 as a photopolymerization initiator, 24.5 wt % of methyl ethyl ketone, 24.5 wt % of 2-butanol, 1 wt % of XX-113BQ (average diameter: 2.0 μm, refractive index: 1.555, copolymerized particles of polystyrene and polymethyl methacrylate, manufactured by Sekisui Plastic), and 0.1 wt % of MA-ST (silica particles having a diameter of 15 nm, manufactured by Nissan Chemical) were mixed to prepare a coating composition for forming an antiglare layer.

Examples 1 and 2 and Comparative Examples 1 and 2: Preparation of Optical Laminate Example 1

The coating composition for forming an antiglare layer of Preparation Example 1 was coated onto an acrylic film (WOLF, provided by Sumitomo, thickness: 60 μm) containing rubber particles having an average diameter of 300 nm a bar coating method so that the thickness after drying was about 5 um.

Then, the film coated with the composition was dried at 40° C. for 2 minutes, and cured under a condition of 50 mJ/cm$^2$ with a mercury lamp.

Example 2

The coating composition for forming an antiglare layer of Preparation Example 1 was coated onto an acrylic film (WOLF, provided by Sumitomo, thickness: 60 μm) containing rubber particles having an average diameter of 300 nm by a bar coating method so that the thickness after drying was about 5 um.

Then, the film coated with the composition was dried at 70° C. for 2 minutes, and cured under a condition of 50 mJ/cm$^2$ with a mercury lamp.

Comparative Example 1

The coating composition for forming an antiglare layer of Preparation Example 1 was coated onto an acrylic film (WOLF, provided by Sumitomo, thickness: 60 μm) containing rubber particles having an average diameter of 300 nm by a bar-coating method so that the thickness after drying was about 5 um.

Then, the film coated with the composition was dried at 90° C. for 2 minutes, and cured under a condition of 50 mJ/cm$^2$ with a mercury lamp.

Comparative Example 2

The coating composition for forming an antiglare layer of Preparation Example 2 was coated onto an acrylic film (WOLF, provided by Sumitomo, thickness: 60 μm) containing rubber particles having an average diameter of 300 nm by a bar-coating method so that the thickness after drying was about 5 um.

Then, the film coated with the composition was dried at 40° C. for 2 minutes, and cured under a condition of 50 mJ/cm$^2$ with a mercury lamp.

Experimental Example: Measurement of Physical Properties of Optical Laminate

Experimental Example 1: Evaluation of Haze of Optical Laminate

The internal haze and the external haze of the optical laminates prepared in Examples and Comparative Examples were determined, and the total haze value was determined.

Specifically, using a haze meter (HM-150, A light source, manufactured by Murakami Color Research Laboratory), the transmittance was measured three times according to JIS K 7361 standard, and the haze was measured three times according to JIS K 7105 standard, and then then the average value of each measurement was calculated to obtain the total haze.

Further, in order to make the surface of the manufactured coating layer flat, an adhesive having a haze of 0 was attached to the surface so that external irregularities were embedded in the adhesive, and then, the haze was measured three times with a haze meter, and the average value was calculated to obtain the internal haze.

Thereafter, the external haze value was obtained by subtracting the internal haze value from the total haze value.

Experimental Example 2: Measurement of Image Sharpness (%)

The image sharpness of the optical laminates obtained in each of Examples and Comparative Examples was measured using ICM-1T manufactured by Suga Test Instrument Co., Ltd.

The image sharpness was measured with slit widths of 0.125 mm, 0.5 mm, 1 mm and 2 mm and displayed as a total.

Experimental Example 3. Measurement of Cross-Section

Using an electron transmission microscope (TEM), the area where the rubber particles are present inside the antiglare layer in each of the optical laminates of Examples and Comparative Examples was specifically confirmed, and the results are shown in FIGS. 1 to 4.

Experimental Example 4. Measurement of Scratch Resistance

The surface of the optical Laminates obtained in Examples and Comparative Examples were rubbed back and forth 10 times with a steel wool (#0000) under a load at a speed of 27 rpm.

The scratch resistance was evaluated by confirming the maximum load at which the number of scratches of 1 mm or more was 1 or less by observing with the naked eye.

TABLE 1

|  | Example 1 | Example 2 | Comparative Example 1 | Comparative Example 2 |
|---|---|---|---|---|
| Haze(%) | 3.0 | 2.7 | 1.8 | 1.9 |
| External haze (%) | 0.5 | 0.4 | 0.0 | 0.1 |
| Internal haze (%) | 2.5 | 2.3 | 1.8 | 1.8 |
| Image sharpness | 305 | 310 | 340 | 335 |
| Maximum thickness at which rubber particles were observed | 0% | 29% | 100% | 62% |
| Scratch resistance | 500 gf | 500 gf | Less than 100 gf | Less than 100 gf |

Figure 1:
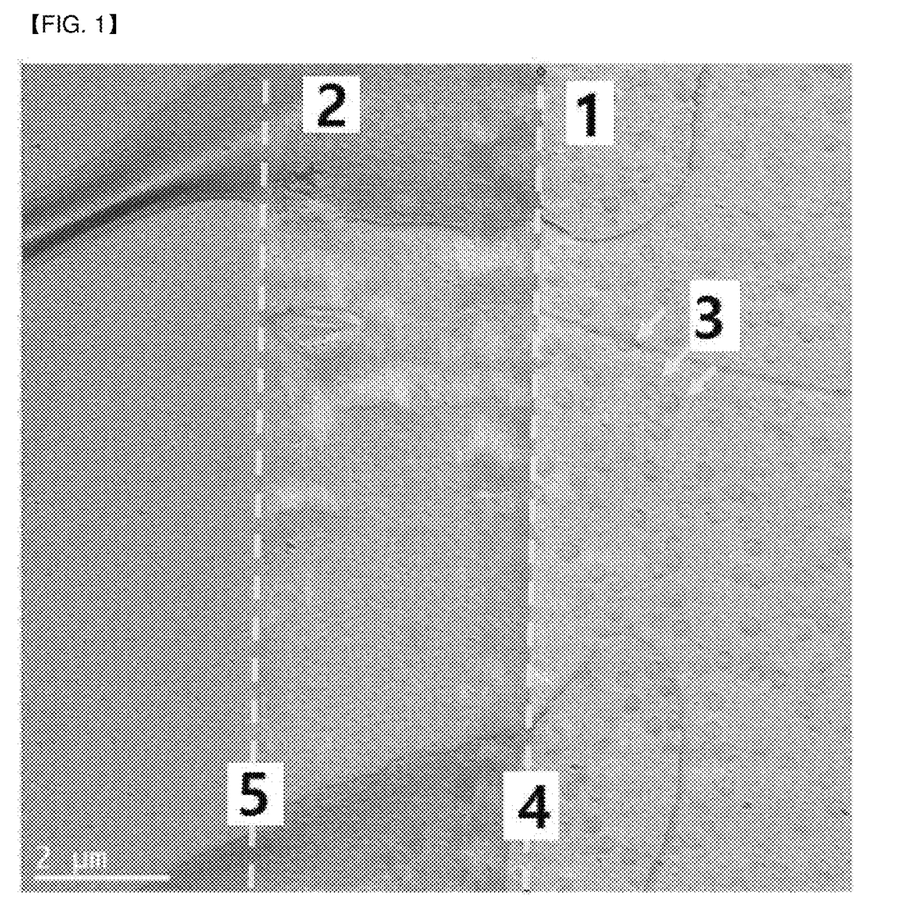
FIG. 1 shows a cross-sectional TEM photograph of the optical laminate of Example 1.
Figure 2:
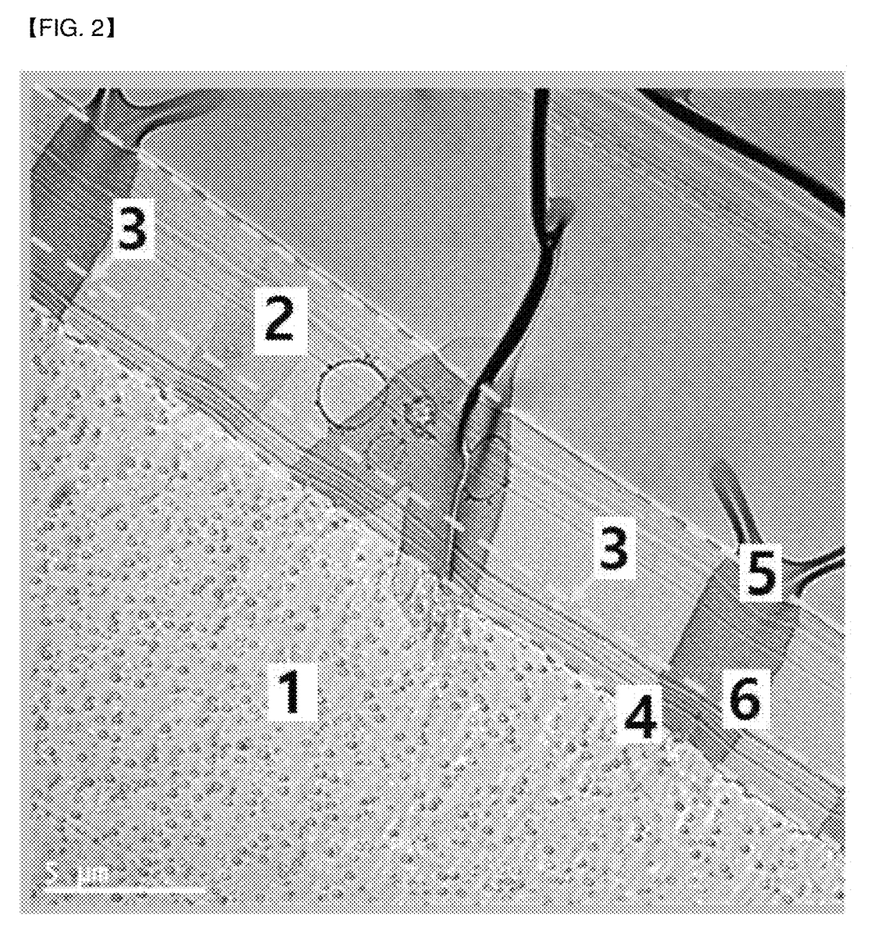
FIG. 2 shows a cross-sectional TEM photograph of the optical laminate of Example 2.

Further, as shown in FIG. 1, it was confirmed that in the optical laminate of Example 1, the rubber particles do not exist in the antiglare layer beyond the interface between the polymer substrate and the antiglare layer, and that in the optical laminate of Example 2, the rubber particles having a cross-sectional diameter of 10 to 500 nm exist within 29% of the thickness of the antiglare layer from the interface between the polymer substrate and the antiglare layer.

Figure 3:
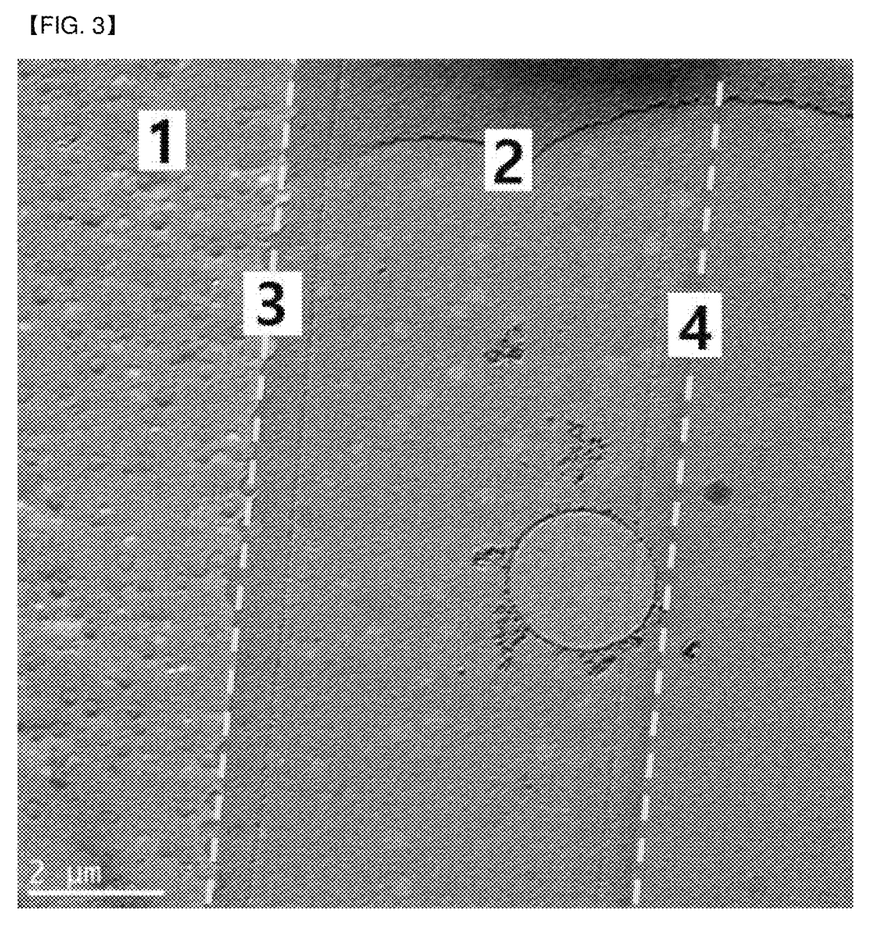
FIG. 3 shows a cross-sectional TEM photograph of the optical laminate of Comparative Example 1.
Figure 4:
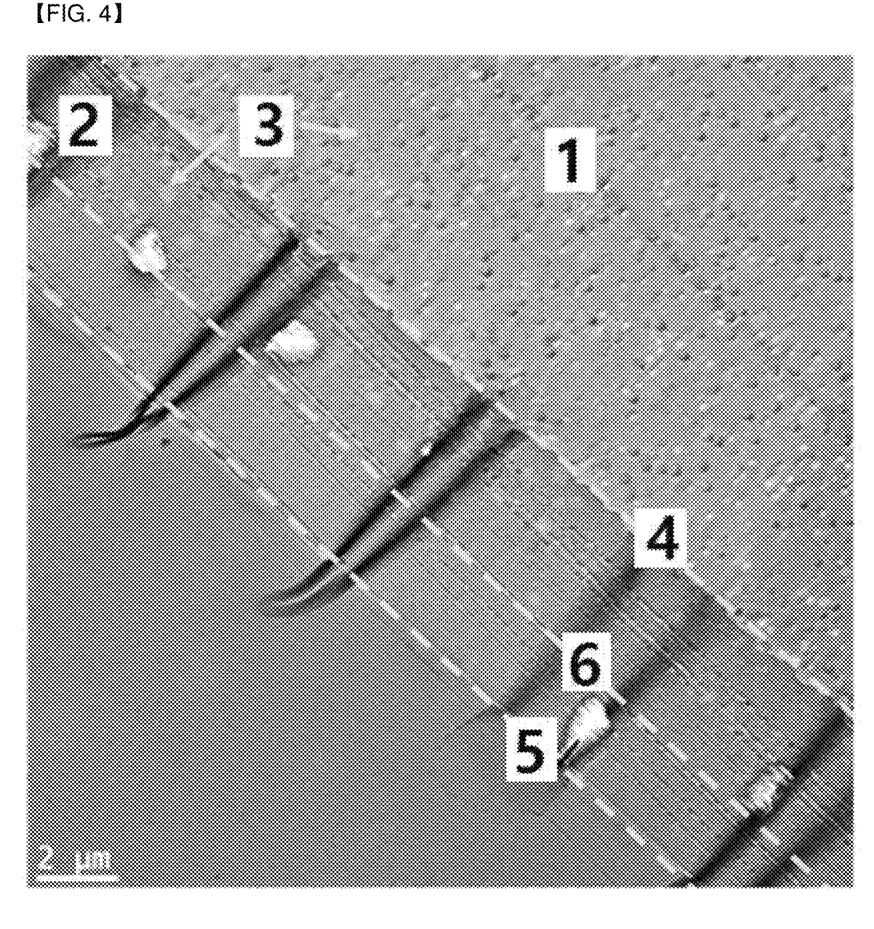
FIG. 4 shows a cross-sectional TEM photograph of the optical laminate of Comparative Example 2.
Figure 5:
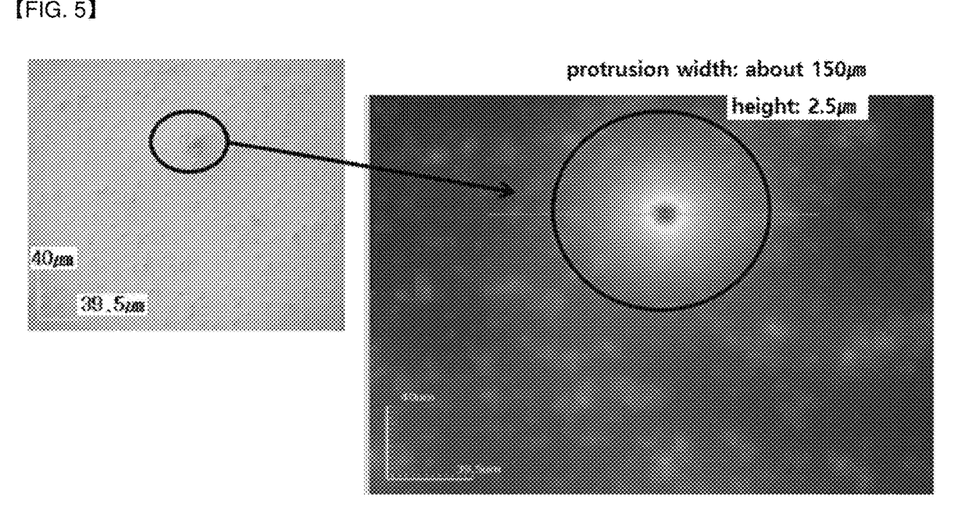
FIG. 5 is a photograph of fine protrusions of 100 μm or more, which was confirmed in the optical laminate of Example 3, taken with a laser microscope (Optical Profiler).

In contrast, it was confirmed that in the optical laminate of Comparative Example 1, the rubber particles existing in a polymer substrate exists even in the entire area of the antiglare layer, and it was confirmed that in the optical laminate of Comparative Example 2, the rubber particle having a cross-sectional diameter of 10 to 500 nm exists up to a range of 62% of the thickness of the antiglare layer from the interface between the polymer substrate and the antiglare layer.

On the other hand, as shown in Table 1, it was confirmed that the optical laminates of Examples 1 and 2 have a haze and high image sharpness at the level that antiglare property can be realized while having a high scratch resistance, whereas the optical laminates of Comparative Examples 1 and 2 have a low level of scratch resistance, and they had an external haze value that was difficult to have anti-glare property.

Examples 3 to 5 and Comparative Examples 3 to 4: Preparation of Optical Laminate (1) Preparation of Coating Composition for Forming Antiglare Layer The components shown in Table 2 below were mixed to prepare a coating composition for forming an antiglare layer.

(2) Preparation of Optical Laminate

Each of the above-prepared coating solutions for forming the antiglare layer was coated onto the polymer substrate described in Table 2 below by #12 mayer bar, and then dried at a temperature of 40° C. for 2 minutes, followed by UV curing to form an antiglare layer (coating thickness of 4 μm).

When UV curing, the UV lamp used a H bulb, the curing reaction was carried out under a nitrogen atmosphere, and the amount of UV light irradiated during curing is 150 mJ/cm$^2$.

TABLE 2

|  |  | Example 3 | Example 4 | Example 5 | Comparative Example 3 | Comparative Example 4 |
|---|---|---|---|---|---|---|
| Polymer substrate | | Acryl film(WOLF, provided by Sumitomo, thickness: 60 μm, containing acrylic rubber particles having an average diameter of 300 nm) | | | | |
| Antiglare layer coating composition | TMPTA | 9.85 | 7.88 | 8.77 | 10.7 | 8.76 |
| | PETA | 6.11 | 7.88 | 7.18 | 4.67 | 6.81 |
| | UA-306T | 6.11 | 5.32 | 6.98 | 4.67 | 5.26 |
| | G8161 | 6.9 | 7.88 | 5.98 | 8.76 | 7.79 |
| | D1173 | 0.89 | 0.83 | 0.83 | 0.83 | 0.83 |
| | I184 | 0.89 | 0.83 | 0.83 | 0.83 | 0.83 |
| | Tego270 | 0.04 | 0.04 | 0.06 | 0.04 | 0.05 |
| | BYK350 | 0.07 | 0.07 | 0.07 | 0.07 | 0.07 |
| | Organic fine particle XX-103BQ | 0.97 | 1.16 | 1.32 | 1.15 | 1.31 |
| | Inorganic fine particle MA-ST | 0.18 | 0.18 | 0.18 | 0.2 | 0.16 |
| | EtOH | | | | 41.84 | 9.73 |
| | n-BA | 12.81 | 12.8 | 13.12 | | 29.2 |
| | 2-BuOH | 55.18 | 55.13 | 54.68 | 26.24 | 29.2 |
| | Coating thickness (μm) | 4 | 4 | 4 | 4 | 4 |

TMPTA: trimethyloylpropyltriacrylate
PETA: pentaerythritol triacrylate
UA-306T: reaction product of toluene diisocyanate and pentaerythritol triacrylate as urethane acrylate (manufactured by Kyoeisha Chemical)
G8161: photocurable acrylate polymer (Mw~200,000, manufactured by San Nopco)
IRG-184: initiator (Irgacure 184, Ciba)
Tego-270: leveling agent (Tego)
BYK350: leveling agent (BYK Chemie)
IPA: Isopropyl Alcohol
XX-103BQ (2.0 μm 1.515): Copolymerized particles of polystyrene and polymethyl methacrylate (manufactured by Sekisui Plastic)
XX-113BQ (2.0 μm 1.555): Copolymerized particles of polystyrene and polymethyl methacrylate (manufactured by Sekisui Plastic)
MA-ST (30% in MeOH): a dispersion in which nanosilica particles with a size of 10 to 15 nm are dispersed in methyl alcohol (product of Nissan Chemical)
EtOH: ethanol
n-BA: n-butyl acetate
2-BuOH: 2-butanol Experimental Example: Measurement of Physical Properties of Optical Laminate Experimental Example 5. Confirmation of the Ratio of Fine Particles that Aggregate on the Surface of the Antiglare Layer Samples cut into 50 cm*50 cm (width*length) from the optical laminates obtained in each of Examples and Comparative Examples were placed on black matt paper under LED illumination with a illuminance of 700 lux.

Then, the film was arranged so that light was made incident at 70 degrees based on the surface of the sample film, and then observed from the side where the light was reflected to find fine protrusions having stronger sparkling than the peripheral part.

The parts confirmed by the fine protrusions were represented by circles of 5 mm in diameter, and the number of protrusions and the protrusion area ratios were calculated according to the following general formula.

At this time, the number of protrusions was calculated by the following general formula 2, the ratio of the area where fine protrusions having a diameter of 100 um or more were formed on the outer surface of the antiglare layer of the aggregate of the organic fine particles or inorganic fine particles was defined by the following general formula 1.

The ratio of the area where the fine protrusions are located on one surface of the antiglare layer=
(the number of fine protrusions*the area of a circle having a diameter of 5 mm)/the area of one side of the antiglare layer (mm$^2$)　　[General Formula 1]

The "circle having a diameter of 5 mm" in the general formula 1 is defined as an area where the fine protrusions are located.

Number of protrusions (number/m$^2$): Number measured at 50 cm*50 cm*4　　[General Formula 2]

TABLE 3

| | Result of Experimental Example | | | | |
|---|---|---|---|---|---|
| | Example 3 | Example 4 | Example 5 | Comparative Example 3 | Comparative Example 4 |
| Haze(%) | 2.1 | 2.1 | 2 | 2.0 | 2.1 |
| Image sharpness | 368 | 360 | 343 | 300 or less | 300 or less |
| Number of protrusions (number(s)/m2) | 3 | 16 | 38 | about 1000 | about 300 |

TABLE 3-continued

| | Result of Experimental Example | | | | |
|---|---|---|---|---|---|
| | Example 3 | Example 4 | Example 5 | Comparative Example 3 | Comparative Example 4 |
| Area ratio of protrusion (%) | <0.1 | <0.1 | <0.1 | ~2% | 0.5% |
| Maximum thickness at which rubber particles were observed | <25% | <25% | <50% | <25% | <90% |
| Scratch resistance | 700 gf | 700 gf | 500 gf | 500 gf | 500 gf NG |

*Haze evaluation, image sharpness(%) measurement, cross-section measurement of the optical laminates were performed by the methods of Experimental Examples 1 to 4.

As shown in Table 3, it was confirmed that the optical laminates of Examples have fine protrusions existing on the outer surface of the antiglare layer of 50/m² or less, and realize a haze and high image sharpness at the level that antiglare property can be realized while having a high scratch resistance.

On the contrary, it was confirmed that the optical laminates of Comparative Examples have the ratio of the fine protrusions existing on the outer surface of the antiglare layer of 100/m² or more, and realize a low level of scratch resistance or a relatively low image sharpness.

Figure 6:
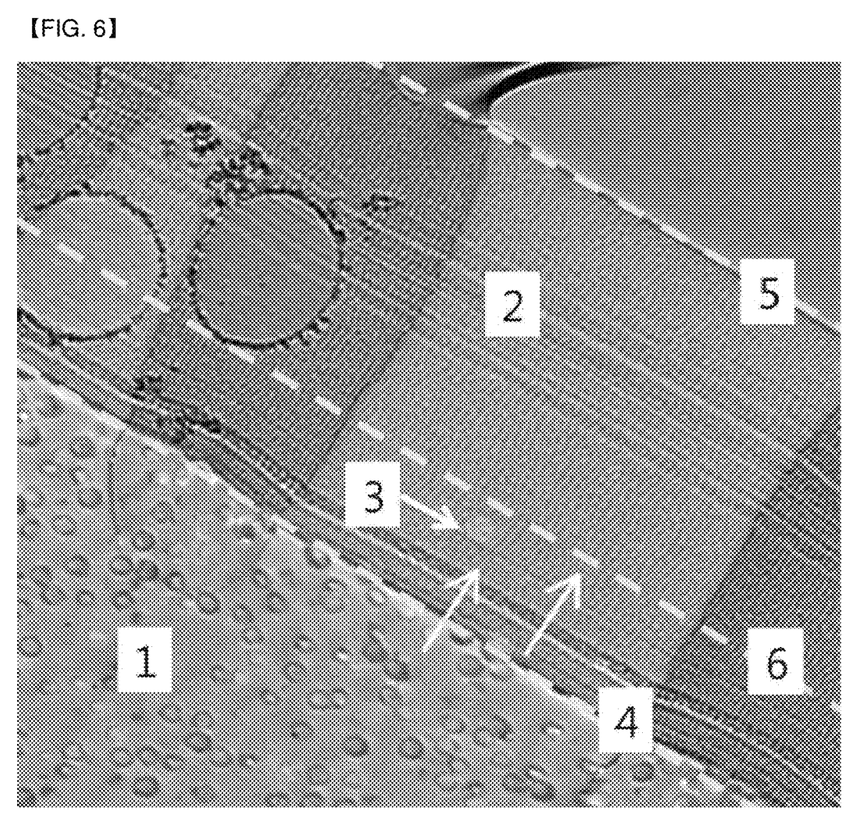
FIG. 6 shows a cross-sectional TEM photograph of the optical laminate of Example 3.

Further, as shown in FIG. 6, it was confirmed that in the optical laminate of Example 3, the rubber particles having a cross-sectional diameter of 10 to 500 nm exist within 25% of the thickness of the antiglare layer from the interface between the polymer substrate and the antiglare layer.

Figure 7:
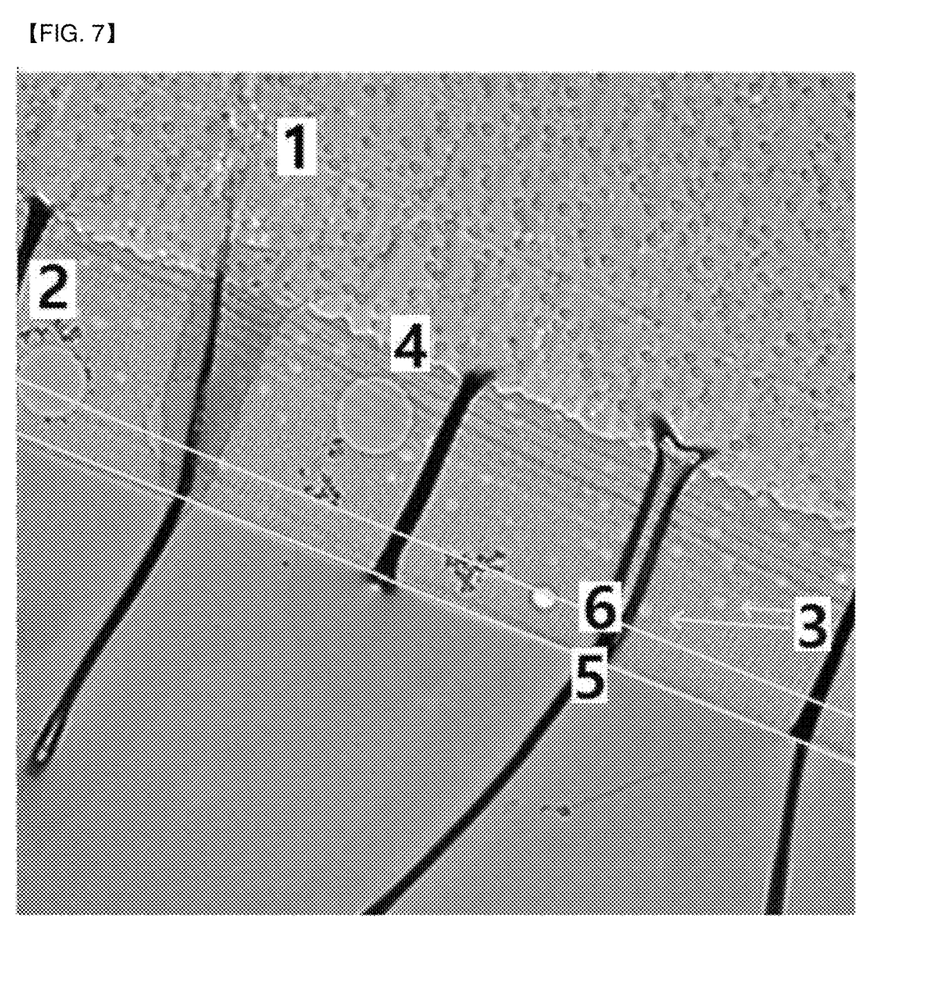
FIG. 7 shows a cross-sectional TEM photograph of the optical laminate of Comparative Example 4.

On the contrary, as shown in FIG. 7, it was confirmed that in the optical laminate of Comparative Example 4, the rubber particle having a cross-sectional diameter of 10 to 500 nm exists from the interface between the polymer substrate and the antiglare layer to a range of 90% of the thickness of the antiglare layer.

EXPLANATION OF SYMBOLS

1 polymer substrate
2 antiglare layer
3 rubber particles
4 interface between polymer substrate and antiglare layer
5 surface of antiglare layer
6 Maximum range where rubber particles exist from the interface between the polymer substrate and the antiglare layer

The invention claimed is:

1. An optical laminate comprising: a polymer substrate containing a polymer resin and rubber particles having a cross-sectional diameter of 10 to 500 nm dispersed in the polymer resin; and
   an antiglare layer containing a binder resin, and organic fine particles or inorganic fine particles dispersed in the binder resin,
   wherein the organic fine particles have a cross-sectional diameter of 1 to 50 μm, and the inorganic fine particles have a cross-sectional diameter of 1 to 500 nm,
   wherein an interface between the polymer substrate and the antiglare layer allows the rubber particles having a cross-sectional diameter of 10 to 500 nm that are contained in the polymer substrate to migrate into the antiglare layer,
   wherein the migrated rubber particles having a cross-sectional diameter of 10 to 500 nm exist within 50% of the thickness of the antiglare layer from the interface between the polymer substrate and the antiglare layer,
   wherein the organic fine particles or the inorganic fine particles contained in the antiglare layer aggregate to form protrusions having a diameter of at least 100 μm and a ratio of the number of the protrusions formed on an outer surface of the antiglare layer is 50/m² or less,
   wherein a ratio of the area of a region where the protrusions are located on the surface of the antiglare layer as defined by general formula 1 is 0.5 area % or less:

Ratio of the area of a region where the protrusions are located on a surface of the antiglare layer= (the number of protrusions*the area of a circle having a diameter of 5 mm)/the area of the surface of the antiglare layer (mm²), [General Formula 1]

wherein the "circle having a diameter of 5 mm" in the general formula 1 is defined as the region where the protrusions are located, and
   wherein the optical laminate has a total haze of 0.1% or more and 3.0% or less, according to JIS K 7105 standard.

2. The optical laminate of claim 1, wherein the rubber particles having a cross-sectional diameter of 10 to 500 nm exist within 30% of the thickness of the antiglare layer from the interface between the polymer substrate and the antiglare layer.

3. The optical laminate of claim 1, wherein the polymer resin includes at least one resin selected from a (meth)acrylate resin, a cellulose resin, a polyolefin resin, and a polyester resin.

4. The optical laminate of claim 1, wherein the rubber particles having a cross-sectional diameter of 10 to 500 nm contained in the polymer substrate are rubber particles of the same components.

5. The optical laminate of claim 4, wherein the rubber particles include at least one rubber selected from styrene-butadiene-based rubber and acrylic-based rubber.

6. The optical laminate of claim 1, wherein the rubber particles include at least one rubber selected from styrene-butadiene-based rubber and acrylic-based rubber.

7. The optical laminate of claim 1, wherein the polymer substrate has a thickness of 10 to 150 μm, and the antiglare layer has a thickness of 1 to 10 μm.

8. The optical laminate of claim 7, wherein a ratio of the thickness of the antiglare layer to the thickness of the polymer substrate is 0.008 to 0.8.

9. The optical laminate of claim 1, wherein a ratio of a thickness of the antiglare layer to a thickness of the polymer substrate is 0.008 to 0.8.

10. The optical laminate of claim 1, wherein
the polymer substrate includes 5 to 50 parts by weight of the rubber particles relative to 100 parts by weight of the binder resin.

11. The optical laminate of claim 1, wherein
the organic fine particles contained in the antiglare layer have a cross-sectional diameter of 1 to 10 μm, and
the inorganic fine particles contained in the antiglare layer have a cross-sectional diameter of 1 nm to 300 nm.

12. The optical laminate of claim 1, wherein
a moisture permeation amount of the polymer substrate measured for 24 hours at 40° C. and 100% humidity is 150 g/m² or less.

13. The optical laminate of claim 1, wherein
the diameter of the protrusions is 100 μm to 300 μm.

14. The optical laminate of claim 13, wherein
the ratio of the area of a region where the protrusions are located on the surface of the antiglare layer as defined by the general formula 1 is 0.3 area % or less.

15. A polarizing plate comprising the optical laminate of claim 1.

16. A display device comprising the polarizing plate of claim 15.

\* \* \* \* \*